United States Patent
Cho et al.

(10) Patent No.: US 7,373,150 B2
(45) Date of Patent: May 13, 2008

(54) METHOD AND SYSTEM FOR ALLOCATING FREQUENCY RESOURCES BASED ON MULTIPLE FREQUENCY REUSE FACTORS IN CELLULAR COMMUNICATION SYSTEMS

(75) Inventors: Jae-Hee Cho, Seoul (KR); Soon-Young Yoon, Seoul (KR); Sang-Hoon Sung, Suwon-si (KR); In-Seok Hwang, Seoul (KR); Hoon Huh, Seongnam-si (KR); Sung-Joon Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 118 days.

(21) Appl. No.: 11/074,111

(22) Filed: Mar. 7, 2005

(65) Prior Publication Data
US 2005/0197129 A1  Sep. 8, 2005

(30) Foreign Application Priority Data
Mar. 5, 2004  (KR) .................. 10-2004-0015986

(51) Int. Cl.
*H04Q 7/20* (2006.01)
*H04M 1/00* (2006.01)
*H04B 1/38* (2006.01)
*H04B 15/00* (2006.01)

(52) U.S. Cl. .................. 455/447; 455/446; 455/550.1; 455/556.2; 455/561; 455/524; 455/452.2; 455/448

(58) Field of Classification Search .. 455/452.1–452.2, 455/45, 403, 422.1, 550.1, 553.1, 556.2, 455/560–561, 446–451, 500, 466, 509–514, 455/515, 101–105, 463–464, 67.11, 41.2, 455/434, 507, 516–517, 522, 524–526, 556.1; 375/267, 275, 299, 347; 370/203, 206, 208, 370/347–350, 319–321, 328–330, 337, 338, 370/341, 430–431
See application file for complete search history.

(56) References Cited

U.S. PATENT DOCUMENTS

| | | | |
|---|---|---|---|
| 5,657,323 A * | 8/1997 | Jan et al. ..................... | 370/252 |
| 6,223,040 B1 * | 4/2001 | Dam .......................... | 455/447 |
| 6,539,203 B1 * | 3/2003 | Herrig ......................... | 455/62 |
| 6,904,283 B2 * | 6/2005 | Li et al. ...................... | 455/450 |
| 6,940,827 B2 * | 9/2005 | Li et al. ....................... | 370/278 |
| 6,993,339 B2 * | 1/2006 | Skillermark et al. ......... | 455/447 |
| 7,042,857 B2 * | 5/2006 | Krishman et al. .......... | 370/329 |
| 2003/0012174 A1 * | 1/2003 | Bender et al. .............. | 370/347 |
| 2003/0169681 A1 * | 9/2003 | Li et al. ..................... | 370/203 |
| 2004/0081131 A1 * | 4/2004 | Walton et al. ............... | 370/344 |
| 2006/0120473 A1 * | 6/2006 | Baum .......................... | 375/260 |

* cited by examiner

*Primary Examiner*—Meless Zewdu
(74) *Attorney, Agent, or Firm*—The Farrell Law Firm, PC (57) ABSTRACT

Disclosed are a system and a method of allocating frequency resource in a cellular communication system. The method includes the steps of dividing a predetermined time duration into at least two sub-time durations, and forming the frequency resource by applying mutually different frequency reuse factors to the sub-time durations.

15 Claims, 11 Drawing Sheets

METHOD AND SYSTEM FOR ALLOCATING FREQUENCY RESOURCES BASED ON MULTIPLE FREQUENCY REUSE FACTORS IN CELLULAR COMMUNICATION SYSTEMS

PRIORITY

This application claims priority to an application entitled "Method And System For Allocating Frequency Resource Based On Multiple Frequency Reuse Factors In Cellular Communication System" filed with the Korean Intellectual Property Office on Mar. 5, 2004 and assigned Serial No. 2004-15986, the contents of which are incorporated herein by reference.

BACKGROUND OF THE INVENTION

1. Field of the Invention

The present invention relates to a cellular communication system. More particularly, the present invention relates to a system and a method for allocating frequency resources based on multiple frequency reuse factors in a cellular communication system using an orthogonal frequency division multiple access (OFDMA) scheme.

2. Description of the Related Art

In general, in a cellular communication system, the same frequency resources can be used in two areas even when they are spaced apart from each other to achieve efficient and effective use of limited frequency resources. The concept of frequency reuse will be described with reference to FIG. 1, which is a schematic view illustrating the concept of frequency reuse in a conventional cellular communication system.

Figure 1:
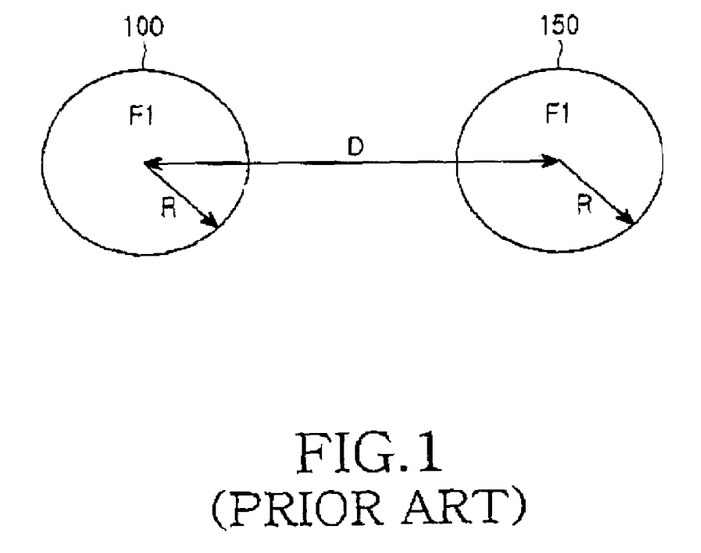
FIG. 1 is a schematic view illustrating the concept of frequency reuse in a conventional cellular communication system.

Referring to FIG. 1, frequency resource F1 used in a first cell 100 having a radius R can be used in a second cell 150 having a radius R, which is spaced from the first cell 100 by a distance D. This is called "frequency reuse".

A frequency reuse factor K is obtained when the same frequency resource, that is, the same frequency band, is reused in K cell units. As the frequency reuse factor increases, a distance D between frequency reuse cells using the same frequency resource also increases. In addition, a wave is attenuated in proportion to a propagation distance, so that interference from using the same frequency resource is reduced as the frequency reuse factor is increased. The amount of frequencies available in one cell can be obtained by dividing the whole frequency band by the frequency reuse factor K, so efficiency of the whole system may be adversely affected as the frequency reuse factor increases.

Figure 2A:
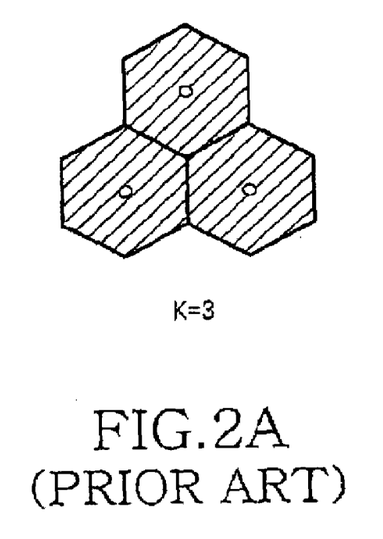
FIG. 2A is a schematic view illustrating frequency resource allocation when a frequency reuse factor K is 3.
Figure 2B:
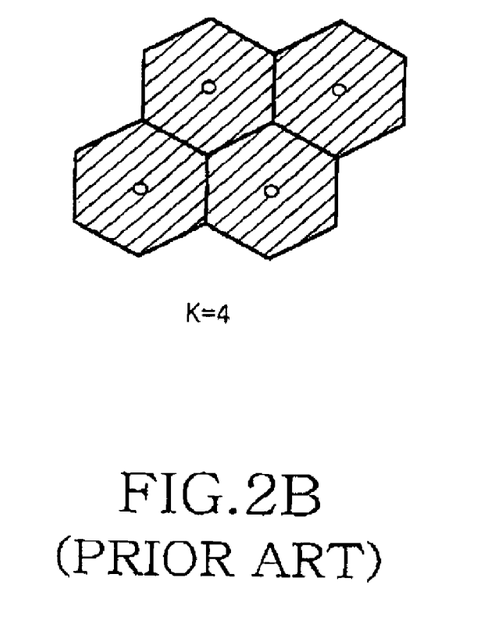
FIG. 2B is a schematic view illustrating frequency resource allocation when a frequency reuse factor K is 4.

Frequency resource allocation according to the frequency reuse factor K will be described with reference to FIGS. 2A to 2F. FIG. 2A is a schematic view illustrating frequency resource allocation when the frequency reuse factor K is 3(K=3). Referring to FIG. 2A, if the frequency reuse factor K is 3, $$\frac{1}{3}$$

of the whole frequency band is allocated to each of the three cells. FIG. 2B is a schematic view illustrating frequency resource allocation when the frequency reuse factor K is 4(K=4). As shown in FIG. 2B, if the frequency reuse factor K is 4, $$\frac{1}{4}$$

of the whole frequency band is allocated to each of the four cells.

Figure 2C:
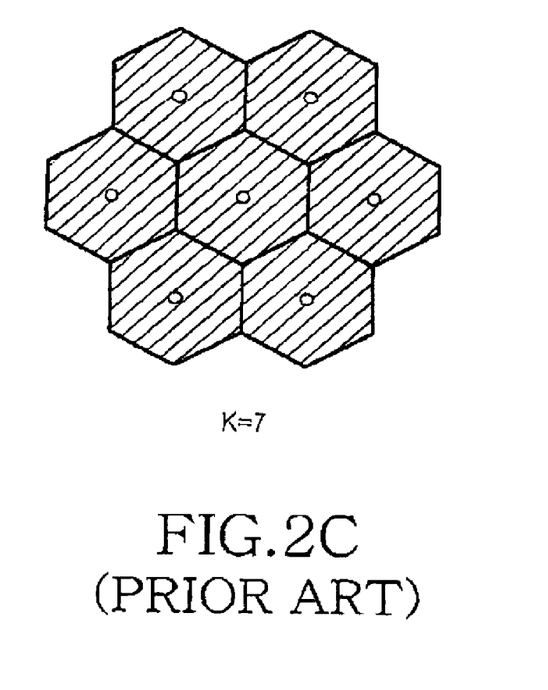
FIG. 2C is a schematic view illustrating frequency resource allocation when a frequency reuse factor K is 7.

FIG. 2C is a schematic view illustrating frequency resource allocation when the frequency reuse factor K is 7(K=7). When the frequency reuse factor K is 7, $$\frac{1}{7}$$

of the whole frequency band is allocated to each of the seven cells.

Figure 2D:
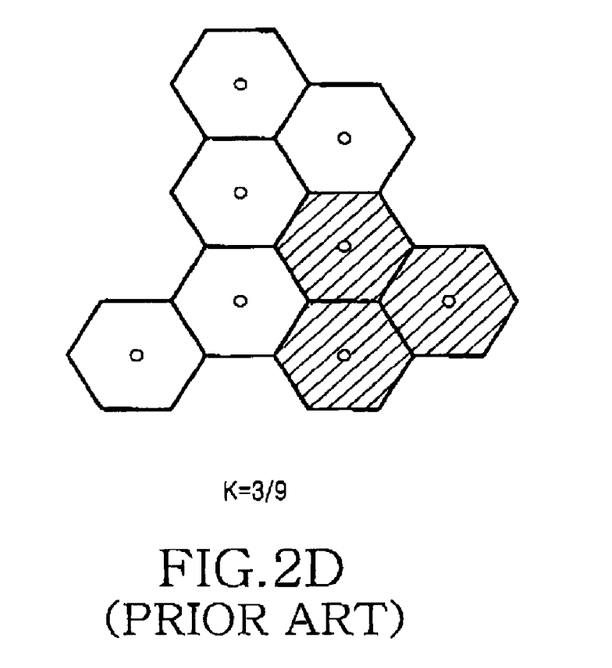
FIG. 2D is a schematic view illustrating frequency resource allocation when a frequency reuse factor K is $$\frac{3}{9};$$

FIG. 2D is a schematic view illustrating frequency resource allocation when the frequency reuse factor K is $$\frac{3}{9}\left(K=\frac{3}{9}\right).$$

In this case, $$\frac{3}{9}$$

of the whole frequency band is allocated to each three cell unit of the total nine cells, respectively, so that the frequency reuse factor $$K\frac{3}{9}$$

is applied to each of nine cells.

Figure 2E:
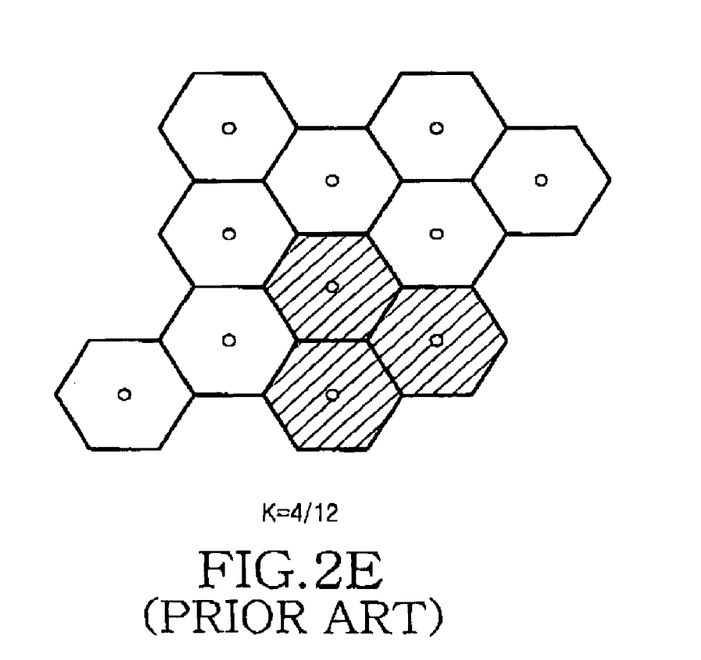
FIG. 2E is a schematic view illustrating frequency resource allocation when a frequency reuse factor K is $$\frac{4}{12};$$

FIG. 2E is a schematic view illustrating frequency resource allocation when the frequency reuse factor K is $$\frac{4}{12}\left(K=\frac{4}{12}\right).$$

The whole frequency band is allocated to each three cell unit of the total twelve cells, so that the frequency reuse factor $$K\frac{4}{12}$$

is applied to each of twelve cells.

Figure 2F:
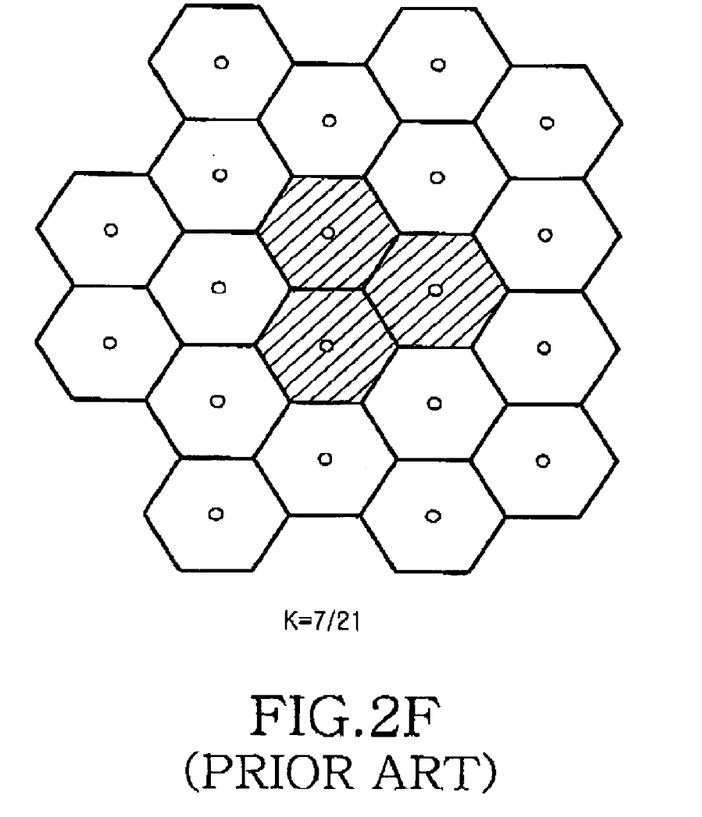
FIG. 2F is a schematic view illustrating frequency resource allocation when a frequency reuse factor K is $$\frac{7}{21};$$

FIG. 2F is a schematic view illustrating frequency resource allocation when the frequency reuse factor K is $$\frac{7}{21}\left(K = \frac{7}{21}\right).$$

As shown in FIG. 2F, if the frequency reuse factor K is $$\frac{7}{21}, \frac{1}{7}$$

of the whole frequency band is allocated to each three cell unit of the twenty-one cells so that the frequency reuse factor K $$\frac{7}{21}$$

is applied to each of the twenty-one cells.

In analog cellular communication system, a minimum signal to noise ratio (SNR) is required for making a wireless voice communication circuit. To satisfy the SNR, a minimum distance between cells is defined. The frequency reuse factor is also defined based on the SNR.

In digital cellular communication system, a minimum SNR has various values depending on an error correction coding rate applied to the wireless circuit, modulation scheme, and transmission scheme. In particular, a code division multiple access (CDMA) communication system applies a frequency reuse factor of "1" to all cells by taking the minimum SNR, system capacity, and network design into consideration. Since the CDMA communication system applies the same frequency band to all cells, a code spreading/de-spreading process discriminates the cells from each other. In this manner, interference of adjacent cells is averaged so that data of a present service cell can be discriminated from data of other cells.

The frequency reuse factor is an important factor in a radio packet cellular communication system using an orthogonal frequency division multiple access (OFDMA) scheme. As discussed above, if the frequency reuse factor K=1, system capacity improves and network design is easier. Hereinafter, a carrier to interference and noise ratio (CINR) of a downlink signal in a cellular communication system with the frequency reuse factor of 1 is described with reference to FIG. 3.

Figure 3:
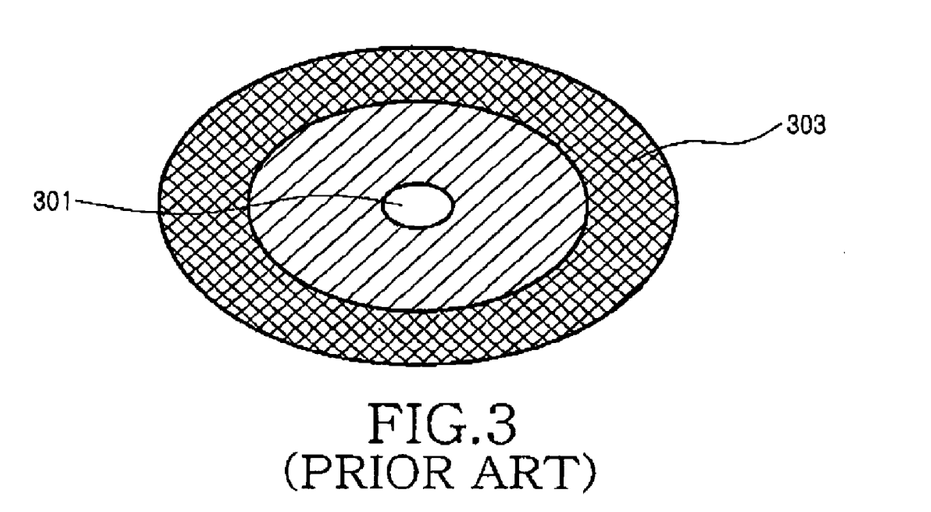
FIG. 3 is a schematic view illustrating the CINR of a downlink in a cellular communication system employing a frequency reuse factor of 1.

FIG. 3 is a schematic view illustrating the CINR of a downlink in a cellular communication system employing the frequency reuse factor of 1. As shown in FIG. 3, in a cell center region 301 adjacent to a base station (BS), intensity of a downlink signal, that is, the CINR is not influenced by intensity of an interference signal having the same frequency band from adjacent cells, so a relatively high CINR is present. However, a cell boundary region 303 spaced from the BS is significantly influenced by the interference signal having the same frequency band from adjacent cells, so a relatively low CINR is present.

When subscriber stations (SSs) are located in the cell boundary region 303, if the cellular communication system provides a low error correction coding rate and a low modulation scheme, frequency efficiency of the SSs in the cell boundary region 303 may degrade even though the SSs can normally receive packet data from the BS.

To solve the above problem, the frequency reuse factor K is set to K>1. Even if the frequency reuse factor K is set to K>1, the signal may be attenuated in proportion to the propagation distance of the wave, so the CINR of the downlink decreases in a direction of the cell boundary region 303. However, since the interference component is very small, the CINR of the downlink is relatively high if the frequency reuse factor K is set to K>1 as compared with the CINR of the downlink when the frequency reuse factor is equal to 1. This will be described in detail with reference to FIG. 4.

Figure 4:
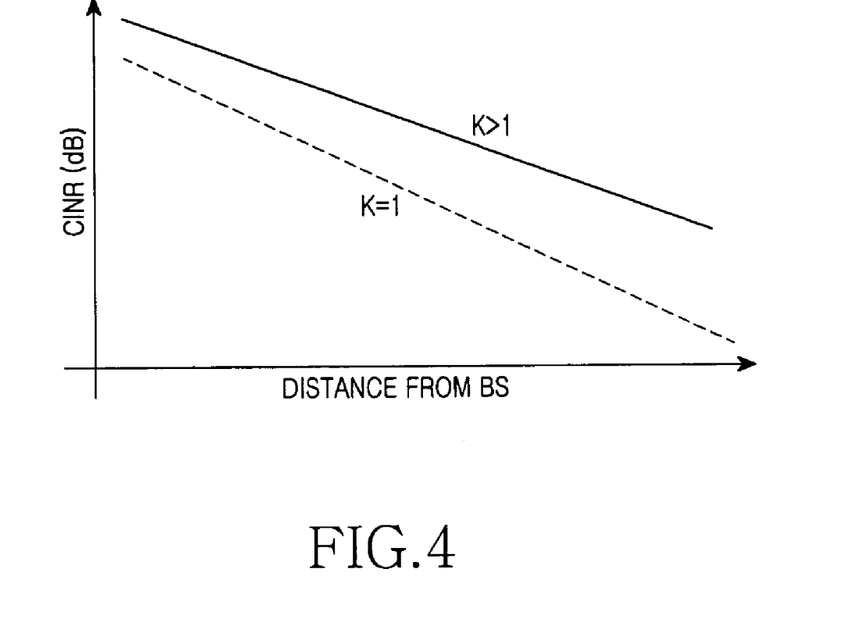
FIG. 4 is a graph illustrating the relationship between a CINR and a distance from a BS when a frequency reuse factor of 1 (K=1) and a frequency reuse factor above 1 (K>1) are applied to a cellular communication system.

FIG. 4 is a graph illustrating the relationship between the CINR and a distance from the BS when a frequency reuse factor is 1 (K=1) and greater than 1 (K>1) are applied to the cellular communication system. As shown in FIG. 4, as the frequency reuse factor increases, frequency efficiency in the cell boundary region can improve. However, since each cell uses 1/K of the whole frequency band, capacity of the whole system is reduced as compared with that of the system employing the frequency reuse factor of 1.

SUMMARY OF THE INVENTION

Accordingly, the present invention has been made to solve the above-mentioned problems occurring in the prior art, and an object of the present invention is to provide a system and a method for allocating frequency resource based on multiple frequency reuse factors in an OFDMA cellular communication system.

Another object of the present invention is to provide a system and a method for allocating frequency resource by applying multiple frequency reuse factors corresponding to states of SSs in an OFDMA cellular communication system, thereby increasing system capacity and improving reliability of the system.

To accomplish these objects, according to a first aspect of the present invention, there is provided a method of allocating frequency resources by a transmitter of a cellular communication system, the method comprising the steps of dividing a predetermined time duration into at least two sub-time durations; and forming the frequency resources by applying different frequency reuse factors to the sub-time durations.

According to a second aspect of the present invention, there is provided a method of allocating frequency resources by a transmitter of a cellular communication system, the method comprising the steps of dividing all sub-carriers of the cellular communication system into at least two groups; dividing each of the groups into at least two sub-groups corresponding to a number of frequency reuse factors applied to the cellular communication system; dividing the sub-groups into sub-group sets corresponding to the frequency reuse factors; and selecting a predetermined number of sub-carriers from each sub-group of the sub-group sets, thereby forming the frequency resources.

According to a third aspect of the present invention, there is provided a system for allocating frequency resources in a cellular communication system, the system comprising a transmitter for dividing a predetermined time duration into at least two sub-time durations and forming the frequency resources by applying different frequency reuse factors to the sub-time durations.

According to a fourth aspect of the present invention, there is provided a system for allocating frequency resources in a cellular communication system, the system comprising a transmitter for dividing all sub-carriers of the cellular communication system into at least two groups, dividing each of the groups into at least two sub-groups corresponding to a number of frequency reuse factors applied to the cellular communication system, dividing the sub-groups into sub-group sets corresponding to the frequency reuse factors, and selecting a predetermined number of sub-carriers from each sub-group of the sub-group sets, thereby forming the frequency resources.

According to a fifth aspect of the present invention, there is provided a method of reusing frequency within a predetermined time duration of a time domain of each base station providing cells/sectors, in which a frequency reuse factor K is defined that one frequency band is repeatedly used in K cells/sectors, the method comprising the steps of employing a frequency reuse factor of 1 in a first time duration, which is a part of the predetermined time duration; and employing the frequency reuse factor K in a second time duration which is a remaining part of the predetermined time duration.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, embodiments of the present invention will be described with reference to the accompanying drawings. In the following detailed description, a detailed description of known functions and configurations incorporated herein will be omitted when it may make the subject matter of the present invention unclear.

Figure 5:
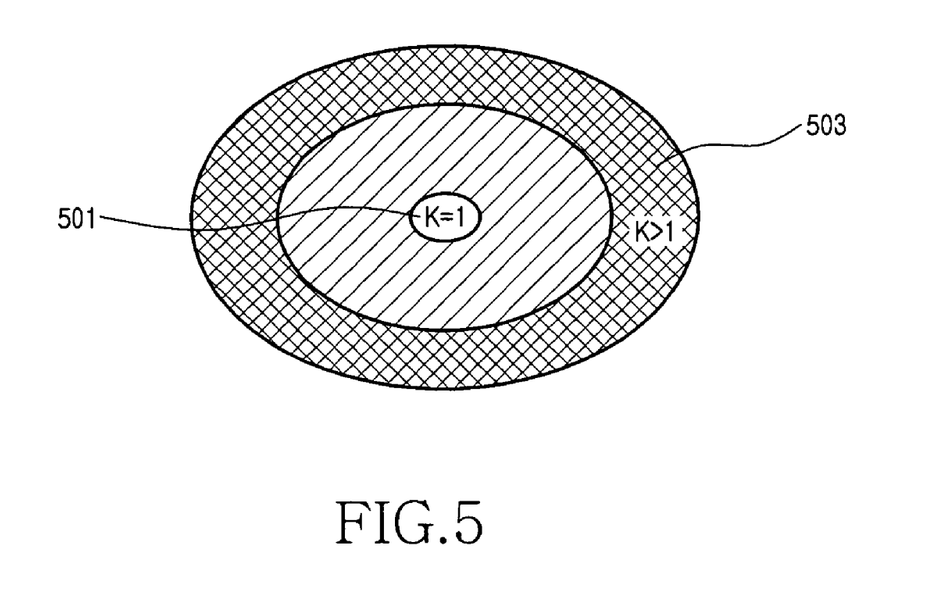
FIG. 5 is a schematic view illustrating frequency resource allocation based on multiple frequency reuse factors in an OFDMA cellular communication system according to an embodiment of the present invention.

FIG. 5 is a schematic view illustrating a frequency resource allocation operation based on multiple frequency reuse factors in an orthogonal frequency division multiple access (OFDMA) cellular communication system according to an embodiment of the present invention.

As shown in FIG. 5 if a subscriber station (SS) is located in a cell center region 501 adjacent to a base station (BS), a carrier to interference and noise ratio (CINR) is relatively high, so the frequency reuse factor for the SS is 1. If the SS is located in a cell boundary region 503, the frequency reuse factor for the SS is greater than 1 (K>1), preventing the CINR from being reduced. If the SS moves from the cell boundary region 503 to the cell center region 501, the allocated SS frequency resource changes from being greater than 1 (K>1) to being equal to 1.

In OFDMA cellular communication systems, frequency resource allocation is carried out in a sub-channel unit that includes at least one sub-carrier. Herein, a method for creating the sub-channel based on the multiple frequency reuse factors in the OFDMA cellular communication system according to an embodiment of the present invention is described with reference to FIG. 6.

Figure 6:
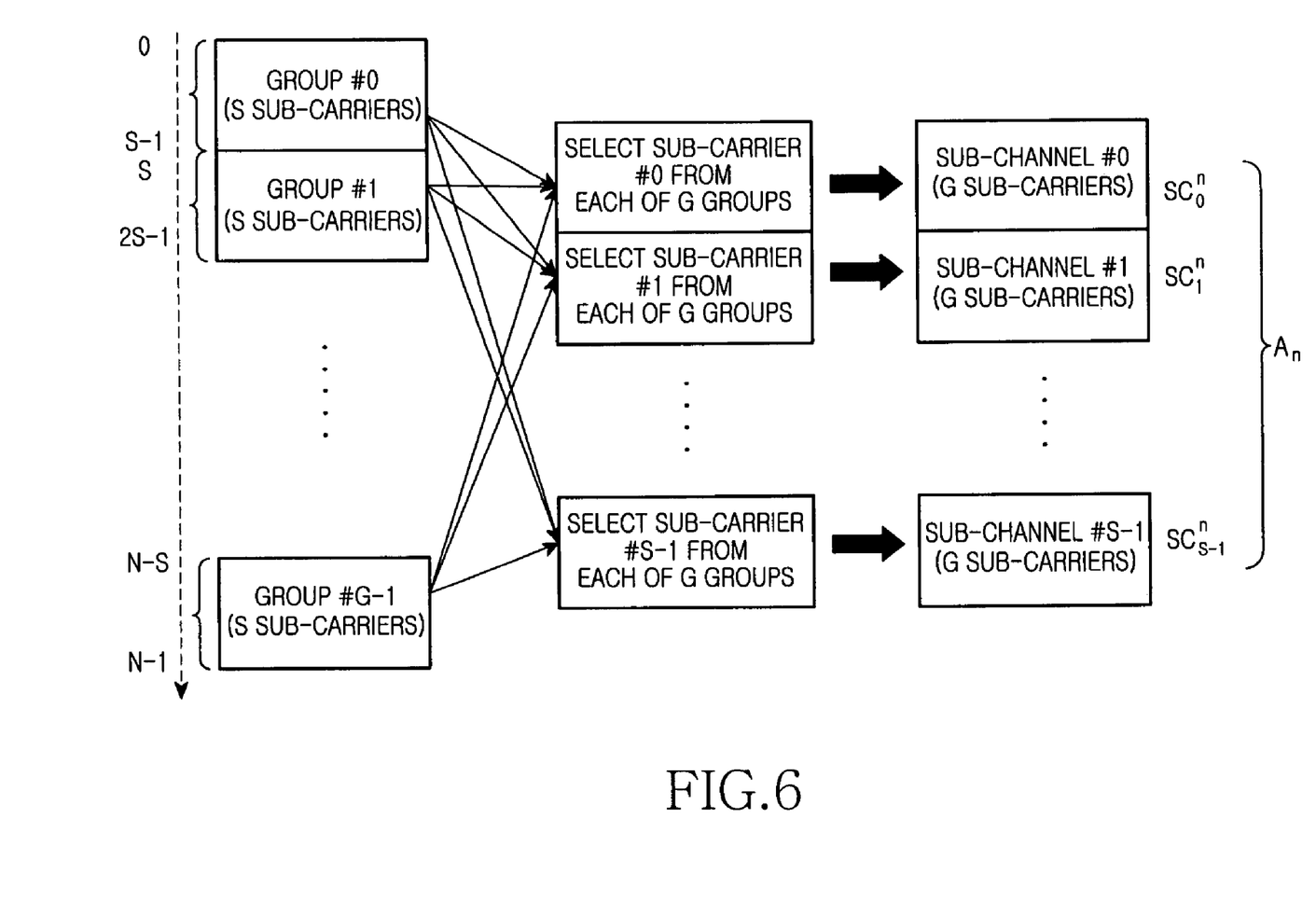
FIG. 6 is a schematic view illustrating a procedure of creating a sub-channel based on multiple frequency reuse factors in an OFDMA cellular communication system according to an embodiment of the present invention.

FIG. 6 is a schematic view illustrating a procedure of creating the sub-channel based on multiple frequency reuse factors in the OFDMA cellular communication system according to an embodiment of the present invention.

Referring to FIG. 6, if the OFDMA cellular communication system uses N sub-carriers, the N sub-carriers are divided into G groups. Each of the G groups consists of S sub-carriers, so that the following equation is satisfied:

$$N = S \times G.$$

A first sub-channel is created by selecting one sub-carrier from each of the G groups. A second sub-channel is created by selecting one sub-carrier from each of the G groups, except for the sub-carrier allocated to the first sub-channel. The above procedure may be repeated until all sub-carriers of the G groups are allocated to the sub-channels. As a result, a set of S sub-channels is created.

It is also possible to create a new set of S sub-channels having sub-carriers different from the above sub-carriers by varying the sub-carrier selection scheme. The number of sets of the S sub-channels including mutually different sub-carriers is $(S!)^G$. Herein, a combination of the sub-carriers forming the sub-channel will be referred to as a "sub-carrier combination".

In the following description, a set of $n^{th}$ sub-channels selected from among the $(S!)^G$ sets of the S sub-channels is defined as $A_n$ and an $m^{th}$ sub-channel of the sub-channel set $A_n$ is defined as $SC_m^n$. Herein, $n=[0, (S!)^G]$, and $m=[0, S-1]$. S sub-channels ($SC_m^n$ and $SC_j^n$) forming the same sub-channel set $A_n$ are orthogonal to each other. So, the sub-carriers forming each of the S sub-channels may not collide with each other.

In addition, the sub-channels ($SC_m^n$ and $SC_1^k$, $n \neq k$) forming mutually different sets of the sub-channels are aligned without ensuring orthogonality therebetween. So, the sub-carriers forming mutually different sub-channels may collide with each other. In addition, C sub-channel sets $A_n$ are selected from among the $(S!)^G$ sets of the S sub-channels. At this time, if a predetermined sub-channel is selected from each of the C sub-channel sets $A_n$, respectively, the number of sub-carriers having the collision characteristics can be uniform. As a result, the total number of sub-carriers with collision characteristics between two sub-channel sets is proportional to the number of sub-channels. As a result, the sub-channel set is created by selecting sub-carriers from among the $(S!)^G$ sets of the S sub-channels. The C sub-channel sets with mutually different sub-carrier combinations and sub-carriers representing uniform collision characteristics can be created through various schemes.

Hereinafter, a method of managing the sub-channel with a frequency reuse factor of 1 in the OFDMA cellular communication system will be described.

First, when frequency reuse factor equals 1, all sub-carriers in a predetermined cell of the OFDMA cellular communication system (all sub-channels) can be used in adjacent channels.

If each cell uses a sub-channel set having the same sub-carrier combination, (that is, if each cell uses the same $A_n$), interference may occur variously in each sub-channel depending on the channel state thereof. Accordingly, when presently measured channel information is applied to a next time duration, it is impossible to predict the channel state.

Hereinafter, a method of creating the sub-channel when the frequency reuse factor is 1 will be described with reference to FIGS. 7A and 7B.

Figure 7A:
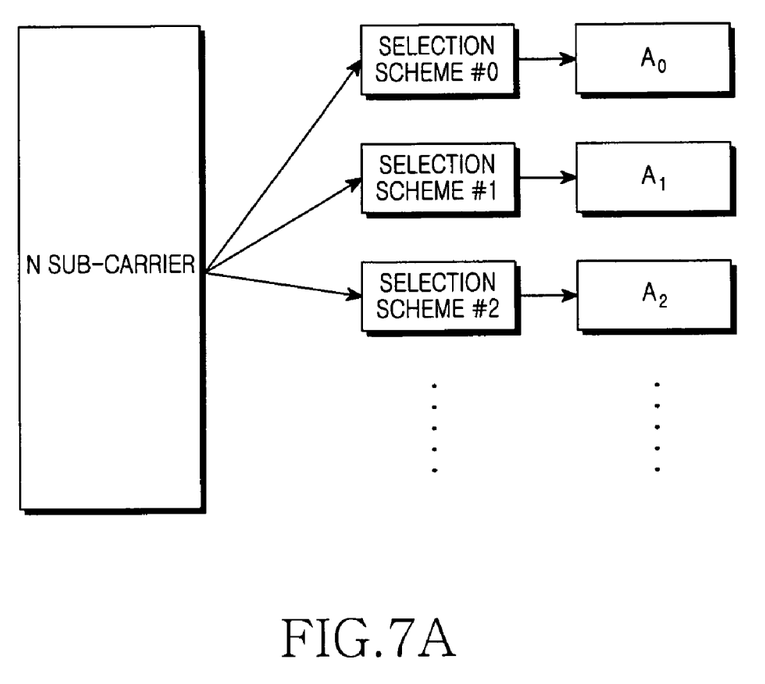
FIG. 7A is a schematic view illustrating a procedure of creating a sub-channel in an OFDMA cellular communication system based on a frequency reuse factor of 1 according to an embodiment of the present invention.

FIG. 7A is a schematic view illustrating a procedure of creating the sub-channel when the frequency reuse factor of 1 is applied in the OFDMA cellular communication system according to an embodiment of the present invention.

Referring to FIG. 7A, if the OFDMA cellular communication system uses N sub-carriers, C sub-channel sets $A_n$ can be created from the N sub-carriers through various sub-carrier selection schemes. FIG. 7B is a schematic view illustrating a set of sub-carriers corresponding to FIG. 7A, allocated to cells forming the OFDMA cellular communication system according to an embodiment of the present invention.

Figure 7B:
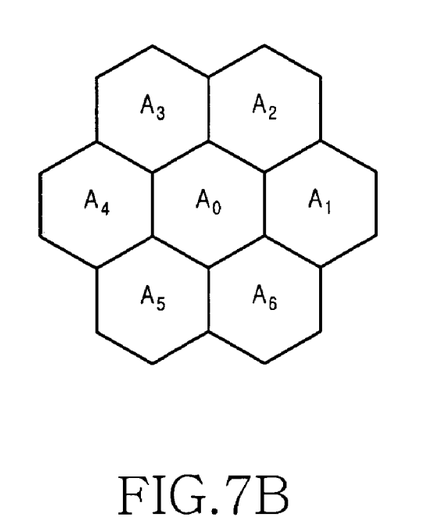
FIG. 7B is a schematic view illustrating a set of sub-channels as shown in FIG. 7A allocated to cells forming an OFDMA cellular communication system according to an embodiment of the present invention.

Referring to FIG. 7B, the C sub-channel sets $A_n$ are allocated to the cells forming the OFDMA cellular communication system. Each sub-channel of the C sub-channel sets $A_n$ is orthogonal to the other sub-channels in the same sub-channel set while representing the uniform collision characteristic with respect to the sub-channels of different sub-channel sets. Accordingly, if the C sub-channel sets $A_n$ are allocated to each cell, the interference component from the adjacent cells can be averaged due to the uniform collision characteristics of the sub-carriers. So, if an amount of resource used in the adjacent cells is not changed, validity of channel state information measured in a predetermined time unit can be maintained. In this manner, the OFDMA cellular communication system can effectively manage the sub-channel based on the frequency reuse factor of 1.

However, although the amount of inter-cell interference can be averaged, the CINR may be reduced from the interference components of adjacent cells. In particular, the CINR is significantly reduced in the cell boundary region.

Error correction coding with very low rate and modulation schemes with lower modulation order can be applied to the SS located in the cell boundary region to ensure service coverage of the wireless cellular communication system. However, error correction coding with very low rate and modulation schemes with lower modulation order may degrade bandwidth efficiency, thereby significantly lowering the transmission rate for the SS located in the cell boundary region.

Hereinafter, the average transmission rate of the SS and the average transmission rate according to the cell radius in the OFDMA cellular communication system based on a frequency reuse factor of 1 will be described with reference to Table 1. Values shown in Table 1 have been obtained through a simulation test using a round robin scheduling scheme, in which both the long-term fading and short term fading are taken into consideration for a channel environment. That is, the cell/sector is divided into a plurality of concentric circles, which do not overlap each other and have a predetermined region. Then, the average transmission rate of each SS allocated to each concentric circle is calculated. After that, the average transmission rate of each SS is calculated to obtain the average transmission rate for each radius (each concentric circle). In the table, the cell radius is normalized to the max cell radius.

The average transmission rate for each radius can be defined as a function of the transmission rate of each SS with respect to the size of the cell region. The average transmission rates shown in Table 1 are average values of the transmission rates of the SSs allocated to the concentric circles, which are gradually lowered as the SSs move towards the boundary region of the cell or sector. For this reason, the average transmission rate corresponding to the circle having the largest size is lower than the average transmission rate in the vicinity of the center region of the cell/sector due to the interference component of the adjacent cell/sector of the OFDMA cellular communication system employing the frequency reuse factor of 1.

TABLE 1

| | Cell radius | | | | | | | | | | |
|---|---|---|---|---|---|---|---|---|---|---|---|
| | 0.1 | 0.2 | 0.3 | 0.4 | 0.5 | 0.6 | 0.7 | 0.8 | 0.9 | 1.0 | 1.0~ |
| Average rate of SS | 1.00 | 0.90 | 0.75 | 0.64 | 0.50 | 0.40 | 0.26 | 0.23 | 0.17 | 0.17 | 0.13 |
| Average rate for radius | 0.26 | 0.60 | 0.83 | 0.89 | 1.00 | 0.90 | 0.63 | 0.49 | 0.37 | 0.24 | 0.25 |

As described above, the OFDMA cellular communication system uses the frequency reuse factor K by taking the interference component from the adjacent cell/sector into consideration. So, the use of frequency resources exerting an influence upon the adjacent cell/sector are limited. For instance, the OFDMA cellular communication system with the frequency reuse factor K uses K frequency bands, each one being different from each other. Alternatively, the system logically divides the sub-carriers included in one frequency band into K sub-carrier groups.

In accordance with the present invention, the sub-carriers included in one frequency band are divided into K sub-carrier groups and the frequency reuse factor K is managed based on the K sub-carrier groups.

Hereinafter, a procedure of creating the sub-channel in the OFDMA cellular communication system based on the frequency reuse factor K will be described with reference to FIGS. 8A and 8B.

Figure 8A:
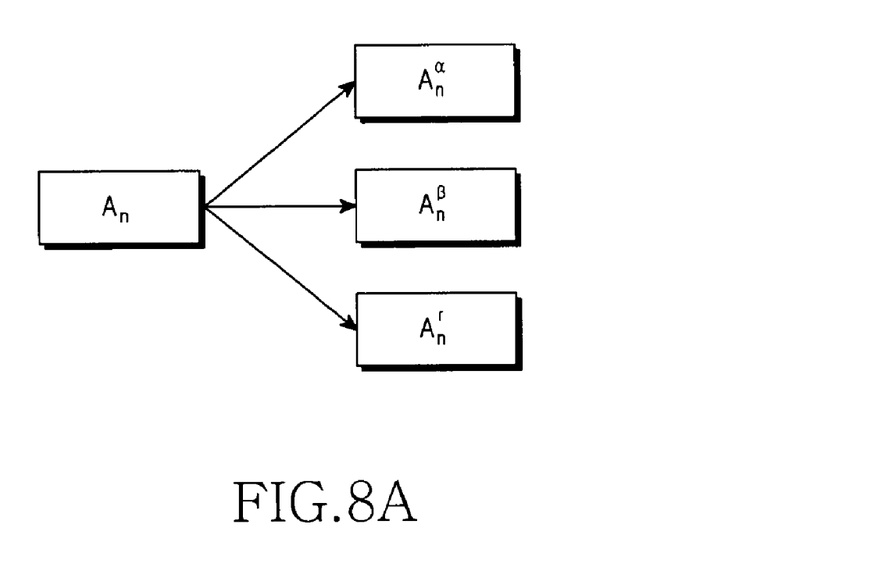
FIG. 8a is a schematic view illustrating a procedure of creating a sub-channel in an OFDMA cellular communication system based on a frequency reuse factor K according to an embodiment of the present invention.

FIG. 8A is a schematic view illustrating the procedure of creating the sub-carrier in the OFDMA cellular communication system based on the frequency reuse factor of K according to an embodiment of the present invention. The sub-carriers formed in one frequency band are divided into K sub-carrier groups and the frequency reuse factor K is managed based on the K sub-carrier groups. In FIG. 8A, the frequency reuse factor is 3 (K=3).

S sub-channels forming a predetermined sub-channel set $A_n$ are divided into three exclusive sub-channel groups defined as $A_n^\alpha$, $A_n^\beta$, and $A_n^\gamma$. FIG. 8B is a schematic view illustrating a group of sub-carriers as shown in FIG. 8A allocated to sectors forming the cell of the OFDMA cellular communication.

Figure 8B:
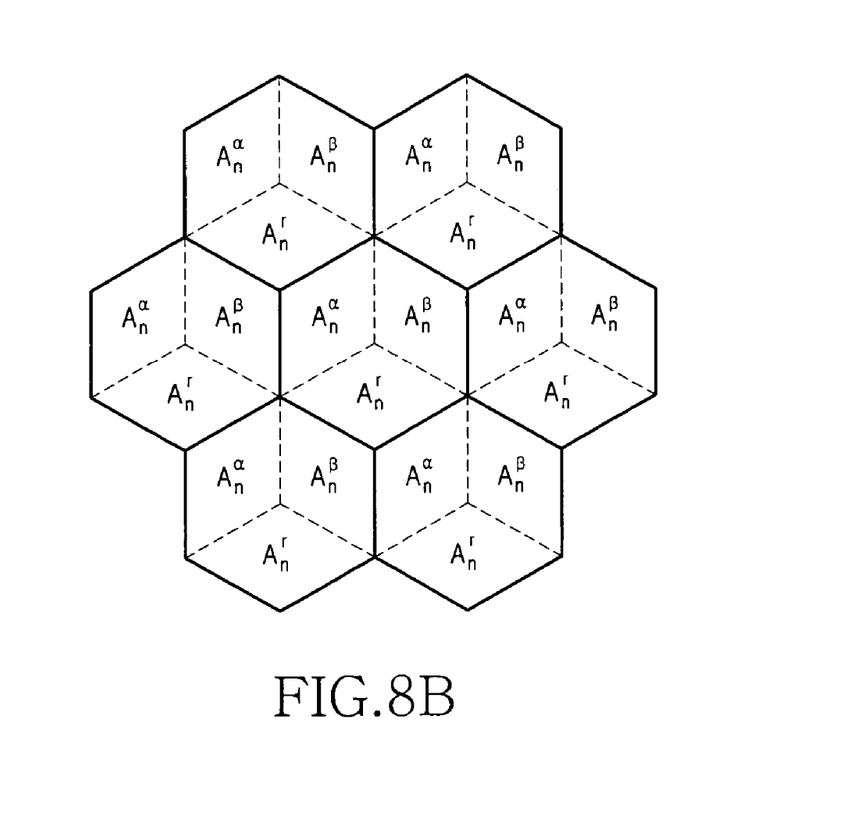
FIG. 8b is a schematic view illustrating a group of sub-channels as shown in FIG. 8a allocated to sectors forming a cell of an OFDMA cellular communication system according to an embodiment of the present invention.

Referring to FIG. 8B, under the frequency reuse factor of 3, three sub-channel groups $A_n^\alpha$, $A_n^\beta$, and $A_n^\gamma$ are allocated to each sector of the cell. In an ideal case, inter-cell/sector interference rarely occurs so that the average transmission rate of the SS located in the boundary region of the cell or sector may increase. However, the resources allocated to each cell or sector is reduced to ⅓, so the capacity of the cell or sector is reduced.

Hereinafter, the average transmission rate according to the cell radius in the OFDMA communication system based on the frequency reuse factors of 1 and 3 will be described with reference to Table 2. Values shown in Table 2 have been obtained through a simulation test using a round robin scheduling scheme, in which both long-term fading and short term fading are taken into consideration for a channel environment. In the table, the cell radius is normalized to the max cell radius.

TABLE 2

| | Cell radius | | | | | | | | | | |
|---|---|---|---|---|---|---|---|---|---|---|---|
| | 0.1 | 0.2 | 0.3 | 0.4 | 0.5 | 0.6 | 0.7 | 0.8 | 0.9 | 1.0 | 1.0~ |
| Frequency reuse factor "1" | 113 | 267 | 378 | 411 | 467 | 428 | 306 | 242 | 181 | 118 | 123 |
| Frequency reuse factor "3" | 90 | 220 | 314 | 320 | 401 | 379 | 326 | 268 | 222 | 152 | 164 |

As can be seen from Table 2, employing the frequency reuse factor of 3 produces a superior transmission rate at the boundary region of the cell or sector and an inferior transmission rate at the cell center region adjacent to the BS as compared with the OFDMA cellular communication system employing the frequency reuse factor of 1. This results because the interference component from the adjacent cell or sector is reduced in the cell center region due to the long-term fading. In addition, since OFDMA cellular communication system employing the frequency reuse factor of 3 may use ⅓ of resource, system capacity is reduced as well.

Hereinafter, a method of employing the frequency reuse factors 1 and K for improving bandwidth efficiency and system capacity of the OFDMA communication system according to an embodiment of the present invention will be described. As described above with reference to FIG. 5, relatively weak interference is applied to the SSs located in the cell center region. The SSs located in the cell center region may operate based on the frequency reuse factor of 1. In contrast, the SSs located in the cell boundary region may operate with K>1 to reduce the interference component applied to the SSs from the adjacent cell or sector. That is, if the OFDMA cellular communication system employs the frequency reuse factors 1 and K, the interference applied to the SSs from the adjacent cell/sector can be reduced in the boundary region of the cell/sector and system capacity can be improved in the cell center region.

However, if the OFDMA cellular communication system employs the frequency reuse factors 1 and K without physically discriminating them, a relatively large interference component results. As a result, the CINR of the SS having the frequency reuse factor K may be reduced and performance thereof will be significantly degraded. To solve the above problem, orthogonality is ensured between frequency resources having mutually different frequency reuse factors.

Hereinafter, a method of allocating frequency resources based on multiple frequency reuse factors according to first and second embodiments of the present invention will be described. According to the first embodiment of the present invention, different frequency reuse factors are applied to mutually different time domains.

According to the second embodiment of the present invention, different frequency reuse factors are applied to mutually different frequency resources.

First, the method of allocating frequency resource in the OFDMA cellular communication system based on multiple frequency reuse factors according to the first embodiment of the present invention will be described with reference to FIG. 9.

Figure 9:
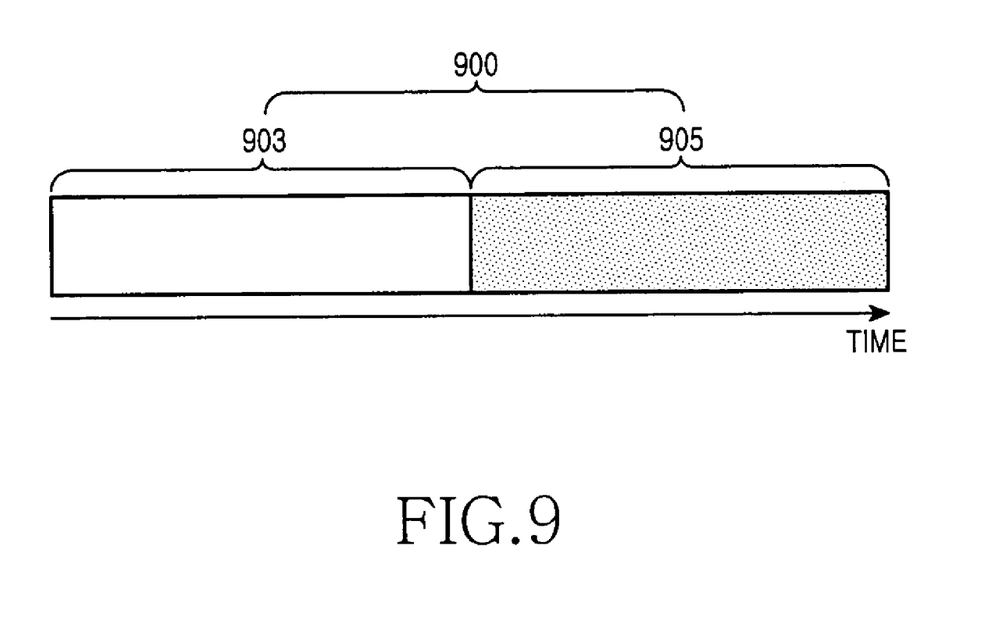
FIG. 9 is a schematic view illustrating frequency resource allocation based on multiple frequency reuse factors in an OFDMA cellular communication system according to a first embodiment of the present invention.

FIG. 9 is a schematic view illustrating frequency resource allocation based on multiple frequency reuse factors in the OFDMA cellular communication system according to the first embodiment of the present invention.

As shown in FIG. 9, according to the frequency resource allocation scheme of the present embodiment, a predetermined time domain, that is, one frame 900 is divided into a field 903 employing a frequency reuse factor of 1 and a field 905 employing the frequency reuse factor K in the time domain. In the field 903 employing the frequency reuse factor of 1, all cells/sectors of the OFDMA cellular communication system use mutually different sub-channel sets in such a manner that all cells/sectors can be managed with the frequency reuse factor of 1. In the field 905 employing the frequency reuse factor of K, each cell/sector uses the same sub-channel set in such a manner that the cell/sector can be managed with the frequency reuse factor of K. In particular, the different sub-channel sets are divided into K exclusive groups such that one of them can be used.

Hereinafter, a procedure of allocating frequency resources based on multiple frequency reuse factors in the OFDMA cellular communication system according to a second embodiment of the present invention will be described with reference to FIG. 10.

Figure 10:
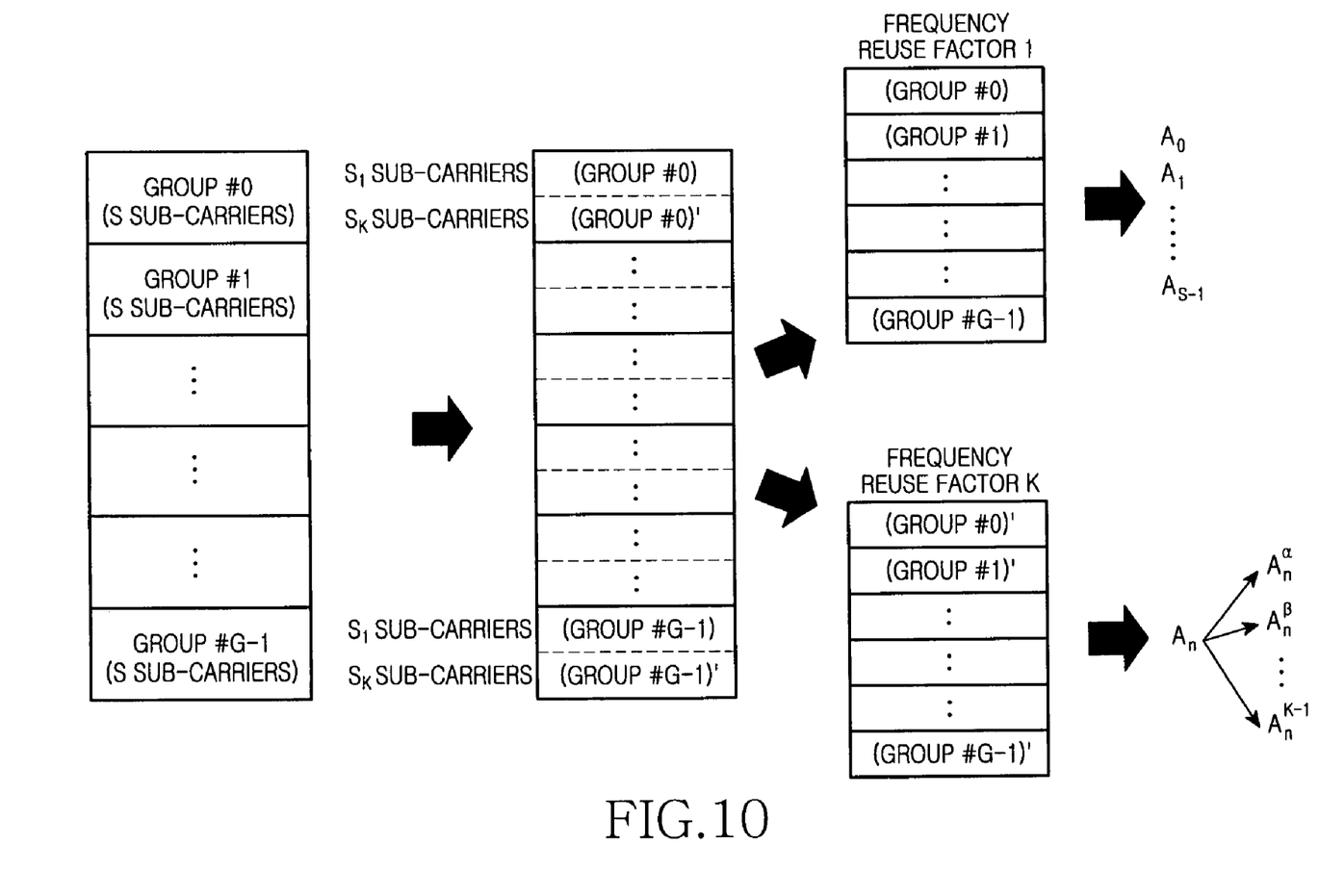
FIG. 10 is a schematic view illustrating a procedure of allocating frequency resource based on multiple frequency reuse factors in an OFDMA cellular communication system according to a second embodiment of the present invention.

FIG. 10 is a schematic view illustrating the procedure of allocating frequency resource based on multiple frequency reuse factors in the OFDMA cellular communication system according to a second embodiment of the present invention.

Referring to FIG. 10, if the OFDMA cellular communication system uses N sub-carriers, the N sub-carriers are divided into G groups. Herein, each of the G groups consists of S sub-carriers, so that the following equation is satisfied:

$$N = S \times G.$$

In addition, each of the G groups is divided into two sub-groups and the sub-groups include $S_1$ sub-carriers and $S_2$ sub-carriers.

First, a first sub-channel is created by selecting one sub-carrier from each of the G sub-groups. A second sub-channel is created by selecting one sub-carrier from each of the G sub-groups except for the sub-carrier allocated to the first sub-channel. The above procedure may be repeated until all sub-carriers of the G sub-groups are allocated to the sub-channels. As a result, a set of $S_1$ sub-channels are created. In addition, as mentioned above, it is also possible to create a new set $A_n$ of C sub-channels having sub-carriers different from the above sub-carriers by varying the sub-carrier selection scheme. The sub-channels of the new set $A_n$ are orthogonal to each other in the same sub-channel set while representing the uniform collision characteristics with respect to sub-channels in the other sub-channel set. The sub-channel set $A_n$ is allocated to each cell/sector so that the cell/sector can be managed with a frequency reuse factor of 1.

Next, a first sub-channel is created by selecting one sub-carrier from each of the G sub-groups including $S_k$ sub-carriers. A second sub-channel is created by selecting one sub-carrier from each of the G sub-groups except for the sub-carrier allocated to the first sub-channel. The above procedure may be repeated until all sub-carriers of the G sub-groups are allocated to the sub-channels. As a result, a set of $S_k$ sub-channels are created. The sub-channels are divided into K exclusive sub-channel groups and allocated to each of K cells/sectors, so that the cells/sectors can be managed with the frequency reuse factor K. In particular, since the sub-channels employing the frequency reuse factor of 1 and sub-channels employing the frequency factor K include mutually different sub-carriers, interference may be prevented even if the frequency reuse factors of 1 and K are simultaneously employed.

Table 3 shows a simulation test result of the OFDMA cellular communication system performing frequency resource allocation based on multiple frequency reuse factors according to first and second embodiments of the present invention.

The simulation test was carried out with respect to three sectors and nineteen cells by applying the average unit transmission rate of a sector of a central cell to the sectors and cells while applying an ideal antenna model and a real antenna model to each sector. In addition, the simulation test result was obtained under the conditions of a route attenuation index of 3.8. The simulation test was carried out with a single path model by taking fading into consideration while applying a shadowing standard deviation of 8 dB if shadowing is represented.

When the frequency reuse factor of 3 is employed, time resource and frequency resource are supported such that interference among 3 sectors is minimized. In addition, the frequency reuse factors 1 and 3 are allocated to the OFDMA cellular communication systems in the same ratio. That is, a length of the frequency reuse factor of 1 is identical to a length of the frequency reuse factor of 3 in the time domain with $S_1 = S_k$ used in the frequency domain.

TABLE 3

| | Ideal ANT | Real ANT | R-ANT, Fading, Shadowing |
|---|---|---|---|
| Frequency reuse factor "1" (bps/Hz) | 1.70 | 1.07 | 0.97 |
| Frequency reuse factor "1", "3" (bps/Hz) | 1.86 | 1.19 | 1.08 |
| Transmission rate gain (%) | 11.0 | 11.2 | 11.1 |

As shown in Table 3, when the frequency reuse factors of 1 and 3 are applied to the OFDMA cellular communication system according to first and second embodiments of the present invention, system performance is improved by about 10% in view of the average unit transmission rate (bits/Hz/Sec) per each sector, as compared with system performance of the OFDMA cellular communication system employing the frequency reuse factor of 1 only.

As mentioned above, frequency resources with different reuse factors are allocated when transmitting a real user packet. The frequency resource (OFDM symbols or sub-channels) having a predetermined frequency reuse factor is allocated for transmitting the user packets depending on the channel state of a receiver. Herein, the channel state of the receiver includes interference in the receiver or parameters corresponding to the interference. According to the present invention, the channel state of the receiver refers to the CINR. Since the greatest interference may occur when frequency reuse factor is 1, frequency resource allocation may be performed by using the CINR with respect to the frequency reuse factor=1. Allocation of frequency resources according to the channel state of the receiver may be done so that the frequency resource with the frequency reuse factor of 1 is primarily allocated for the user packet to be transmitted to the receiver having the largest CINR. The frequency resource with the largest frequency reuse factor is finally allocated to the user packet to be transmitted to the receiver having a minimum CINR.

Figure 11:
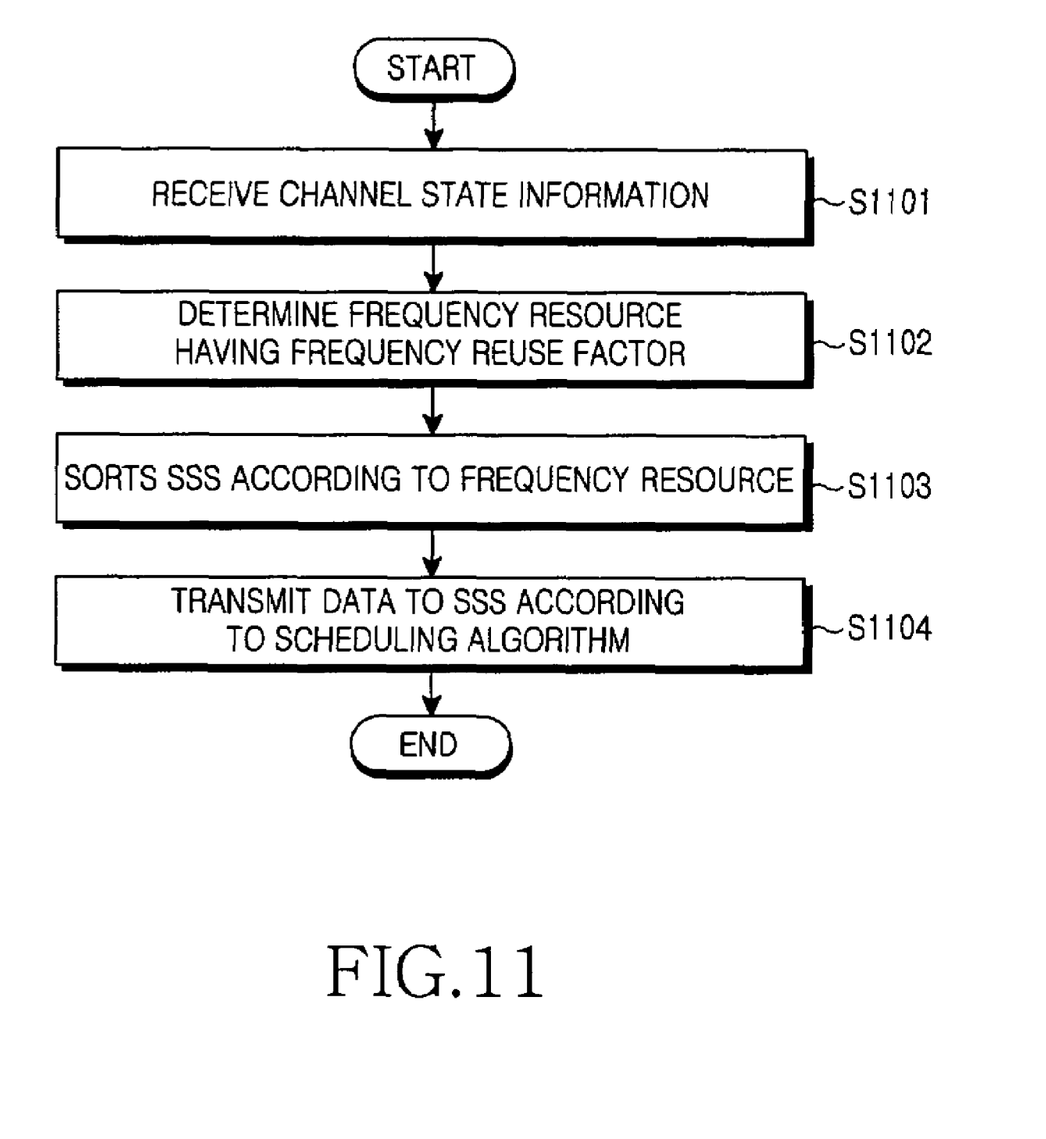
FIG. 11 is a flowchart illustrating a procedure of allocating frequency resources based on frequency reuse factors according to channel states of SSs in an OFDMA cellular communication system according to a second embodiment of the present invention.

FIG. 11 is a flowchart illustrating a procedure of allocating frequency resource, which is allocated based on frequency reuse factors thereof, according to channel states of SSs in an OFDMA cellular communication system according to a second embodiment of the present invention.

Referring to FIG. 11, channel state information is fedback to the BS from each SS (step S1101) and the BS allocates frequency resources with mutually different frequency reuse factors according to the channel state information of the SSs (step S1102). In addition, the BS sorts the SSs according to the frequency resources with different frequency resources allocated to the SSs in step S1102 for data transmission (step S1103) and transmits data to the SSs by scheduling the SSs according to a predetermined scheduling algorithm (step S1104).

As mentioned above, according to the present invention, frequency resources are allocated based on multiple frequency reuse factors in the OFDMA cellular communication system, so that the CINR is not lowered in the cell boundary region, thereby improving system performance. In addition, according to the present invention, the multiple frequency reuse factors are applied according to the channel states of the SSs, so that system capacity can be increased and reliability of the service can be improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of allocating frequency resources by a transmitter of a cellular communication system, the method comprising the steps of:
   dividing a predetermined time duration into at least two sub-time durations;
   forming the frequency resources by applying different frequency reuse factors to the sub-time durations; and
   allocating each of the frequency resources to at least one receiver corresponding to the transmitter, by selecting a frequency reuse factor for the at least one receiver among the different frequency reuse factors according to channel states which are fedback from the at least one receiver to the transmitter.

2. The method as claimed in claim 1, wherein, when allocating the frequency resources to the receivers, the frequency reuse factor applied to the frequency resources allocated to receivers having inferior channel states is larger than the frequency reuse factor applied to the frequency resources allocated to receivers having superior channel states.

3. The method of claimed in claim 1, wherein each of the frequency resources is subject to one of the different frequency reuse factors.

4. The method of claimed in claim 1, wherein each of the at least one receiver uses a frequency resource which is subject to the selected frequency reuse factor.

5. A method of allocating frequency resources by a transmitter of a cellular communication system, the method comprising the steps of:
   dividing all sub-carriers of the cellular communication system into at least two groups;
   dividing each of the groups into at least two sub-groups corresponding to a plurality of frequency reuse factors applied to the cellular communication system;
   dividing the sub-groups into sub-group sets corresponding to the frequency reuse factors; and
   selecting a predetermined number of sub-carriers from each sub-group of the sub-group sets, thereby forming the frequency resources.

6. The method as claimed in claim 5, further comprising the step of:
   allocating the frequency resources to receivers corresponding to the transmitter by applying frequency reuse factors according to channel states of the receivers fedback to the transmitter.

7. The method as claimed in claim 6, wherein, when allocating the frequency resource to the receivers, a frequency reuse factor applied to the frequency resources allocated to receivers having inferior channel states is larger than the frequency reuse factor applied to the frequency resource allocated to receivers having superior channel states.

8. A system for allocating frequency resources in a cellular communication system, the system comprising:
   a transmitter for dividing a predetermined time duration into at least two sub-time durations and forming the frequency resources by applying different frequency reuse factors to the sub-time durations; and
   a plurality of receivers for feeding back channel states thereof to the transmitter.

9. The system as claimed in claim 8, wherein the transmitter allocates the frequency resources to the receivers by applying frequency reuse factors according to the channel states of the receivers fedback to the transmitter.

10. The system as claimed in claim 9, wherein a frequency reuse factor applied to the frequency resources allocated to receivers having inferior channel states is larger than a frequency reuse factor applied to the frequency resources allocated to receivers having superior channel states by the transmitter.

11. A system for allocating frequency resources in a cellular communication system, the system comprising:
   a transmitter for dividing all sub-carriers of the cellular communication system into at least two groups, dividing each of the groups into at least two sub-groups corresponding to a plurality of frequency reuse factors applied to the cellular communication system, dividing the sub-groups into sub-group sets corresponding to the frequency reuse factors, and selecting a predetermined number of sub-carriers from each sub-group of the sub-group sets, thereby forming the frequency resources.

12. The system as claimed in claim 11, further comprising a plurality of receivers for feeding back channel states thereof to the transmitter.

13. The system as claimed in claim 12, wherein the transmitter allocates the frequency resources to the receivers by applying frequency reuse factors according to the channel states of the receivers fedback to the transmitter.

14. The system as claimed in claim 13, wherein a frequency reuse factor applied to the frequency resources allocated to receivers having inferior channel states is larger than a frequency reuse factor applied to the frequency resources allocated to receivers having superior channel states by the transmitter.

15. A method of reusing frequency within a predetermined time duration of a time domain of each base station providing cells/sectors, in which a frequency reuse factor K is defined that one frequency band is repeatedly used in K cells/sectors, the method comprising the steps of:

employing a frequency reuse factor of 1 in a first time duration, which is a part of the predetermined time duration; and employing the frequency reuse factor K in a second time duration which is a remaining part of the predetermined time duration.

* * * * *